(12) United States Patent
Moss et al.

(10) Patent No.: US 7,907,715 B2
(45) Date of Patent: Mar. 15, 2011

(54) SYSTEM AND METHOD FOR BLOCKING A TELEPHONE CALL

(75) Inventors: John W. Moss, Lake Zurich, IL (US); Wayne Heinmiller, Elgin, IL (US); Dianna Tiliks, Palatine, IL (US); Tyler D. Schroepfer, San Antonio, TX (US); David C. Herrera, Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1485 days.

(21) Appl. No.: 11/137,732

(22) Filed: May 25, 2005

(65) Prior Publication Data

US 2006/0285676 A1 Dec. 21, 2006

(51) Int. Cl.
*H04M 3/42* (2006.01)
*H04M 7/00* (2006.01)

(52) U.S. Cl. ........... 379/210.02; 379/211.02; 379/221.12

(58) Field of Classification Search ............. 379/210.02, 379/221.12, 211.02
See application file for complete search history.

(56) References Cited

U.S. PATENT DOCUMENTS

| | | | |
|---|---|---|---|
| 5,070,525 A * | 12/1991 | Szlam et al. | 379/196 |
| 5,596,627 A | 1/1997 | Solomon et al. | |
| 6,101,251 A | 8/2000 | Strickland | |
| 6,205,214 B1 * | 3/2001 | Culli et al. | 379/220.01 |
| 6,330,317 B1 | 12/2001 | Garfinkel | |
| 6,490,345 B2 | 12/2002 | Fleischer, III et al. | |
| 6,724,874 B2 | 4/2004 | Fleischer, III et al. | |
| 6,788,773 B1 | 9/2004 | Fotta | |
| 2002/0012426 A1 | 1/2002 | Gupton | |
| 2002/0122547 A1 | 9/2002 | Hinchey et al. | |
| 2003/0072426 A1 | 4/2003 | Davidson et al. | |
| 2004/0086101 A1 | 5/2004 | Katz | |
| 2004/0174975 A1 | 9/2004 | Sylvain et al. | |
| 2004/0213392 A1 | 10/2004 | Crockett et al. | |

FOREIGN PATENT DOCUMENTS

JP 2001197172 7/2001

* cited by examiner

*Primary Examiner* — Rasha S Al Aubaidi
(74) *Attorney, Agent, or Firm* — Jackson Walker L.L.P.

(57) ABSTRACT

A system and method are provided for blocking a telephone call from a calling party to a called party, the calling party associated with a calling party directory number, including a local-designated trunk group over which the incoming telephone call from the calling party is received. A service switching point is coupled with the local-designated trunk group, the service switching point receiving the telephone call, generating a query message including the calling party directory number, and sending the query message to a service control point. The service control point is coupled with the service switching point, receives the query message, and determines if the calling party is inter Local Access and Transport Area (interLATA) with respect to the service switching point. Where the calling party is determined to be interLATA, the service control point determines a screening indicator value, and generates a response message to the service switching point to block the telephone call received via the local-designated trunk group where the screening indicator value indicates that the telephone call is public telecommunications network provided.

27 Claims, 4 Drawing Sheets

SYSTEM AND METHOD FOR BLOCKING A TELEPHONE CALL

TECHNICAL FIELD

This invention is directed to a system and method for blocking telephone calls, and more particularly, to a system and method for blocking a telephone call received at a switching point via a local-designated trunk group.

BACKGROUND ART

The Public Switched Telephone Network (PSTN) includes, inter alia, Local Exchange Carriers (LECs), and Interexchange Carriers (IXCs). A LEC is a telecommunications provider that provides local telephone service (i.e., intra Local Access and Transport Area (intraLATA) service, such as local and local-toll traffic) to its customers. Often, multiple telecommunications providers may provide telephone service to telephone subscribers within the same LATA. In this case, the telecommunications providers are each considered to be LECs within the LATA, and specifically, competitive LECs (CLECs) with respect to one another. An IXC is a telecommunications provider that may be utilized to provide telecommunications service to telephone subscribers across LATA boundaries (i.e., inter-LATA telephone service). The particular telecommunications provider that acts as the IXC for a telephone subscriber is typically the provider selected by a telephone subscriber as the telephone subscriber's long distance provider.

An exemplary, conventional telecommunications network is shown in the block diagram of FIG. 1. As shown in FIG. 1, a telephone subscriber 102 is provided telephone service through a switching point of the Public Switched Telephone Network (PSTN), here an originating Central Office (CO) 104, via telephone line 106. The originating CO 104 is connected via trunked communications lines 108 to an Inter Exchange Carrier (IXC) Network 110.

The IXC 110 is shown to include a Long Distance (LD) CO switch 112 that is operated by the telecommunications provider 2, where the telecommunications provider 2 has been selected by the telephone subscriber 102 as the subscriber's LD telecommunications service provider. The IXC Network 110 is further coupled to a LEC 120 and a LEC 130 via trunked communication lines 114 and 116, respectively. Here, the LEC 120 is a Competitive LEC (CLEC) with respect to the LEC 130 (i.e., operated by a different telecommunications provider than the LEC 130), and will hereinafter be referred to as CLEC 120. The trunked communication line 116 is a Feature Group B (FGB) or a Feature Group D (FGD) InterLATA toll trunked communication lines, used to route interLATA toll calls from the IXC 110 to the LEC 130. The CLEC 120 includes a CLEC CO switch 122 that may be operated by telecommunications provider 3, where the trunked communication lines 114 may be used to provide any telephone calls, for example IntraLATA toll calls, or InterLATA toll calls, from the LD CO switch 112 to the CLEC 120, under any operational agreements that telecommunications provider 2 may have with telecommunications provider 3.

The LEC 130 may include a Provider 1 LEC Tandem CO switch 132, coupled with a provider 1 LEC CO 134 via trunked communication lines 136, where the LEC CO 134 provides telephone service to the telephone subscriber 138 via a twisted wire pair 140. The CLEC 120 has trunking connections with the LEC 130 via a Local Interconection Trunk Group 124, for handling intraLATA toll and local telephone calls between the CLEC 120 and the LEC 130, and possibly CLEC customer originated InterLATA toll traffic destined for the IXC network 110 (via LEC 130) where the CLEC does not have a direct interconnection with the IXC network. Any of the COs described may be Service Switching Point (SSP) ready. For example, an SSP ready CO is a CO having Advanced Intelligent Network (AIN) functionality capabilities such as operating under software providing AIN 0.1 or higher capabilities.

As shown in FIG. 1, the telephone subscriber 102 may be located in a Local Access and Transport Area (LATA) X of the telecommunications network 100, whereas the CLEC 120 and LEC 130, may be located in a LATA Y of the telecommunications Network. InterLATA telephone calls, for example, from the telecommunications subscriber 102 to the telecommunications subscriber 138, should be routed by the LD CO switch 112 to the LEC 130 serving the subscriber 138 via the FGB/FGD InterLATA toll trunked communication lines 116, so that the LEC 130 may collect appropriate terminating charges for the telephone call. However, in some circumstances, an interLATA telephone call is routed from the LD CO switch 112 to the LEC 130 via the CLEC CO switch 122, and via the local interconnection trunk group 124. In this circumstance, as the LEC Tandem CO receives the call via the local interconnection trunk group 124, a termination fee for the interLATA call is not properly assessed for the interLATA telephone call.

This invention is directed to solving one or more of the problems discussed above.

DETAILED DESCRIPTION OF THE PREFERRED EMBODIMENT

A system and method are provided for blocking a telephone call from a calling party to a called party, the calling party associated with a calling party directory number, and including a local-designated trunk group over which the incoming telephone call from the calling party is received. A service switching point (SSP) is coupled with the local-designated trunk group, the SSP receiving the telephone call, generating a query message including the calling party directory number, and sending the query message to a service control point (SCP). The SCP is coupled with the SSP, receives the query message, and determines if the calling party and SSP are within the same Local Access and Transport Area (LATA). Where the calling party and SSP are not within the same LATA, the SCP determines (i.e., retrieves and analyzes) a screening indicator value associated with the incoming telephone call, and generates a response message to the SSP to block the telephone call received via the local-designated trunk where the screening indicator value indicates that the telephone call is provided from the public telecommunications network.

Having the system and method for blocking a telephone call is advantageous as InterLATA telephone calls received at a SSP serving the called party may be blocked where the InterLATA telephone calls are routed to the SSP via a local-designated trunk group. By blocking such InterLATA toll telephone calls received via a local-designated trunk group, a service provider serving as the LEC for the called party doesn't consume telephone network resources to complete such a telephone call, as completion of the interLATA toll call via the local-designated trunk group may result in failure of the service provider to assess appropriate termination fees for the telephone call.

Figure 1:
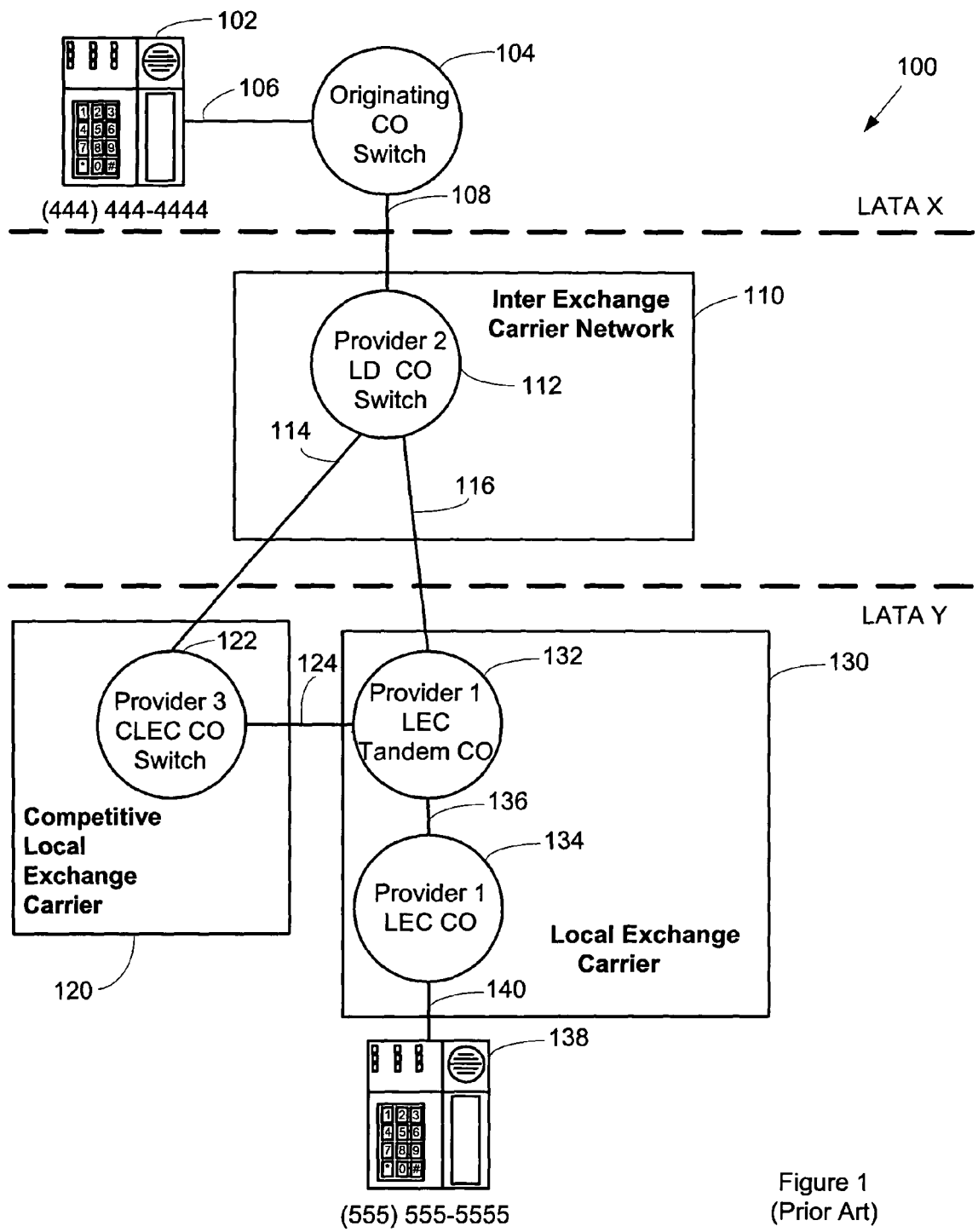
FIG. 1 is a block diagram of an exemplary, conventional telecommunications network.
Figure 2:
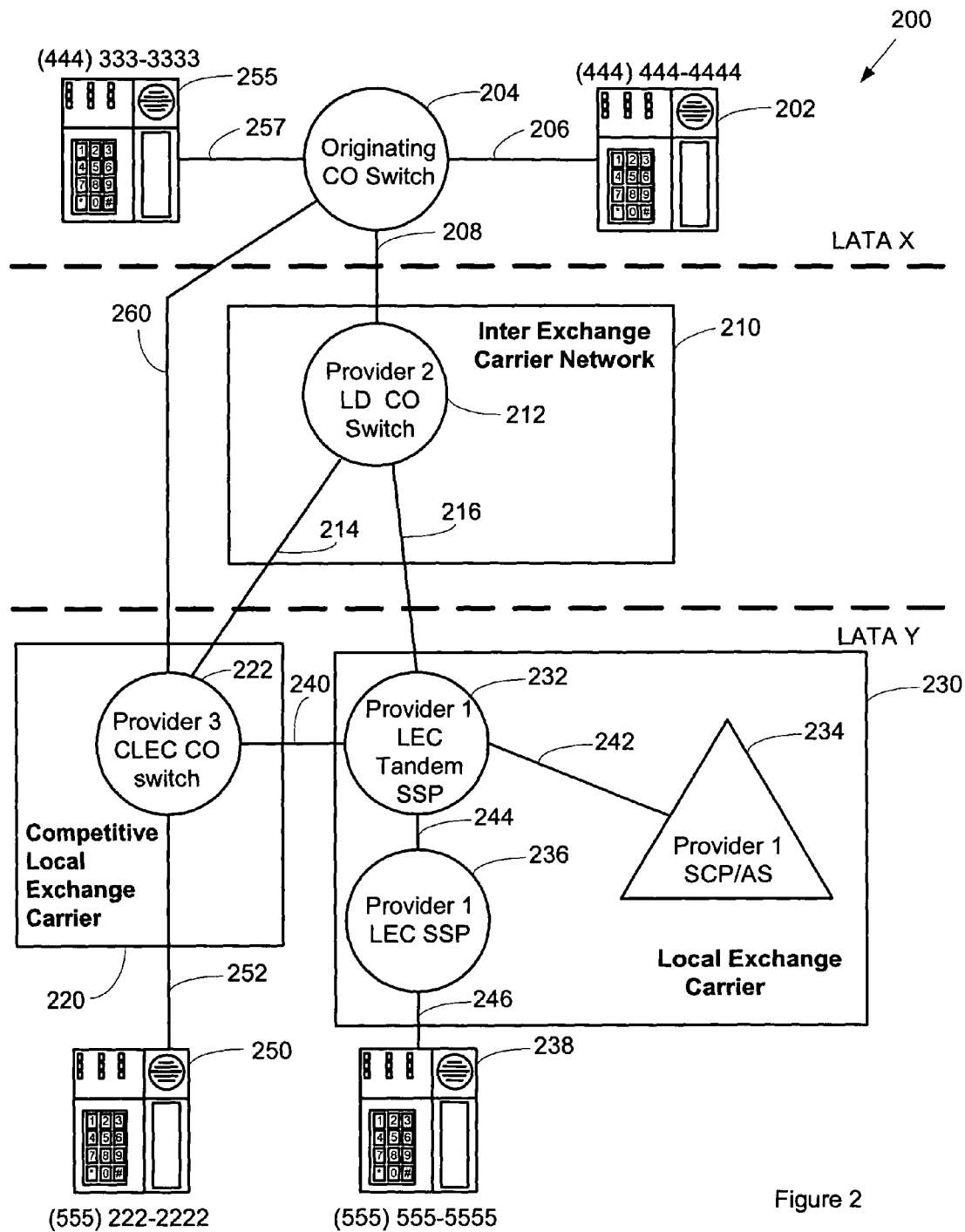
FIG. 2 is a block diagram of a telecommunications network that may be utilized in blocking telephone calls, in accordance with an embodiment of the invention.

A block diagram of an exemplary telecommunications network that may be utilized in the blocking of a telephone call is shown in FIG. 2, in accordance with an embodiment of the invention. As shown in FIG. 2, a telecommunications network 200 includes a telephone subscriber 202 that is provided telephone service through a SSP of the Public Switched Telephone Network (PSTN), here an originating Central Office (CO) switch 204, via telephone line 206. The telephone line 206 may be, for example, a twisted wire pair, that is used to provide telephone service to the telephone subscriber 202. The Originating CO switch 204 is connected via trunked communications lines 208 to an Inter Exchange Carrier (IXC) Network 210, the trunked communication lines 208 having capabilities for carrying communication signals, for example, voice and/or data, between any two locations of the telecommunications network 200.

The IXC 210 may include one or more switching points, here a long distance (LD) CO switch 212, shown to be operated by a telecommunications provider 2, however, it will be appreciated that any number of IXCs may own trunks and/or SSPs within the IXC network 210.

The IXC Network 210 is further coupled to a Local Exchange Carrier (LEC) 220 via trunked communication lines 214, and to a LEC 230 (i.e., specifically a LEC Tandem SSP 232 discussed below) via trunked communication lines, for example, Feature Group B (FGB) and/or Feature Group D (FGD) InterLATA toll trunked communication lines 216. Here, the LEC 220 is a Competitive LEC (CLEC) with respect to the LEC 230 (i.e., operated by a different telecommunications provider than the LEC 230), and will hereinafter be referred to as CLEC 220. The FGB/FGD InterLATA toll trunked communication lines 216 are used to route inter-LATA toll calls to/from the LD CO switch 212 and the LEC 230. The CLEC 220 includes a CLEC CO switch 222 that may be operated by telecommunications provider 3, where the trunked communication lines 214 may be used to provide any telephone calls, for example IntraLATA toll or InterLATA toll calls, to/from the LD CO switch 212 to the CLEC 220, under any operational agreements that telecommunications provider 2 may have with telecommunications provider 3.

The LEC 230 may include the LEC Tandem SSP 232 coupled with a SCP/Applications Server (AS) 234, hereinafter referred to as SCP 234, and with a LEC SSP 236 that is used to provide telephone service to a telephone subscriber 238. The LEC Tandem SSP 232 may be coupled with the LEC SCP 234 via SS7 communication links 242, and coupled with the LEC SSP 236 via trunked communication lines 244. The LEC SSP 236 may be coupled with the telephone subscriber 238 via telephone line 246, that may be, for example, a twisted wire pair providing telephone service to the telephone subscriber 238. The SCP 234 may provide Advanced Intelligent Network (AIN) capabilities to the telecommunications network 200, as well as routing information to the SSPs of the telecommunications network describing how a telephone call from a calling party to a called party is to be routed. At least one of the LEC Tandem SSP 232 and/or LEC SSP 236 is an SSP ready telephone switch, where the SCP 234 is a SCP/AS operating under the AIN 0.1 or higher communication protocol, for example, as defined in any of American National Standard T1.667, International Telecommunications Union Recommendations of the Q.12XX series, Belcore Technical References 1284 and 1285, and Belcore Generic Requirements 1298 and 1299, that are well known to one skilled in the art, and hereby incorporated by reference herein.

The CLEC 220 is shown to have trunking connections with the LEC 230 via a local designated trunk group, for example, the Local Interconection Trunk Group 240, for handling intraLATA toll or local telephone calls between the CLEC 220 and the LEC 230. The Local Interconnection Trunk Group 240 may be further used to handle CLEC customer originated InterLATA toll traffic destined for the IXC network 210 (via LEC 230) where the CLEC does not have a direct interconnection with the IXC network, as will be appreciated by one skilled in the art. The CLEC CO switch 222 may be further coupled with a telephone subscriber 250, for example, via a twisted wire pair 252, used in providing telephone service to the telephone subscriber 250.

A telephone subscriber 255 is further shown in FIG. 2, that is provided telephone service by Originating CO switch 204 via twisted wire pair 257. A private trunk group 260 is further shown, providing a private call path(s) between the Originating CO switch 204 (i.e., via a Centrex group at the Originating CO switch 204) to the CLEC CO switch 222. The telephone subscriber 255 may own rights to use the private trunk group 260, in which case, IntraLATA telephone service may be provided to the subscriber 255 via the public telecommunications network, whereas the private trunk group 260 may be used to provide InterLATA telephone service for the subscriber 255 in LATAs to which the private network extends, for example, the LATA Y as shown in FIG. 2. The private trunk group may further include connections with a network such as the Internet (not shown), as would be appreciated by one skilled in the art. Although not shown, other configurations of, and interconnections with, a private network(s) may be provided.

The CO switches 204, 212, and 222 may be any switching point capable of operating within the PSTN, and may or may not be a SSP ready switching point. An SSP ready switching point is one that has AIN capabilities, for example, as operating under AIN 0.1 or higher software. One skilled in the art will appreciate that one or more signal transfer points, not shown in FIG. 2, may be utilized in the routing of telephone calls in the telecommunications network 200. The telephone subscribers 202, 238, 250 and 255 may be any subscriber of telephone service, for example, using a standard telephone handset, a fax machine, or any other device capable of being utilized in making a telephone call.

As shown in FIG. 2, the telephone subscribers 202 and 255 may be located in a Local Access and Transport Area (LATA) X of the telecommunications network 200, whereas the CLEC 220, LEC 230, and the telephone subscribers 238 and 250, may be located in a LATA Y of the telecommunications network. Further, the IXC network 210 is shown to include LD CO switch 212 operated by telecommunications provider 2. However, as discussed above but not shown, it will be appreciated by one skilled in the art that the IXC network 210 may include switching components and/or trunk groups operated by other telecommunications providers as well. In addition, the LEC 230 is shown as being operated by telecommunications provider 1, whereas the CLEC 220 is shown as being operated by telecommunications provider 3. It will be appreciated by one skilled in the art that the CLEC 220 may instead be operated by another telecommunications provider such as provider 2.

Figure 3:
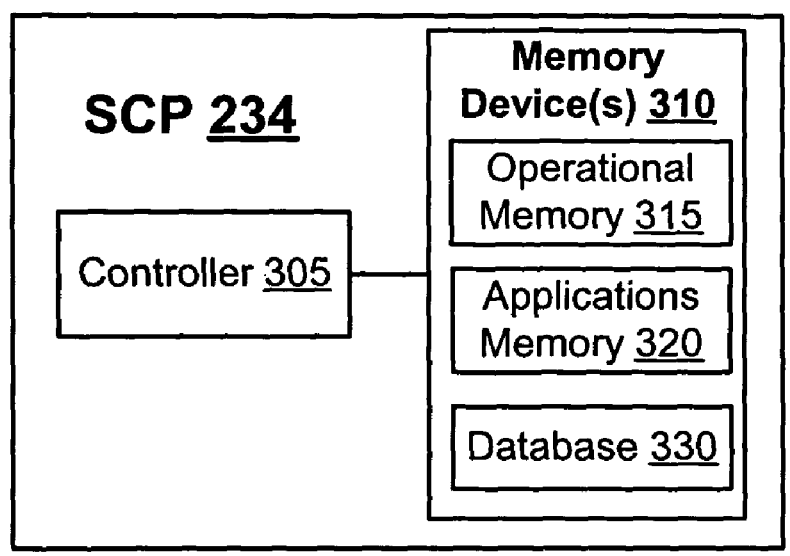
FIG. 3 is a block diagram of a Service Control Point/Application Server that may be used in the blocking of telephone calls, in accordance with an embodiment of the invention.

FIG. 3 is a block diagram of a SCP/AS that may be utilized in the blocking of a telephone call within the telecommunications network 200, in accordance with an embodiment of the invention. As shown in FIG. 3, the SCP 234 may include a controller 305 coupled with a memory device 310. The controller 305 may include any microprocessor, or multiple microprocessors acting together, capable of carrying-out the functionality of the SCP 234 described herein. The memory device 310 may include an operational memory 315, an applications memory 320, and a database 330. The memory device 310 may be implemented as any computer readable medium (CRM) capable of providing the short term or the long term storage of information, including but not limited to, floppy disks, conventional hard disks, any volatile or nonvolatile ROMs including PROM, EPROM, EEPROM, CD-ROM, any RAM including SRAM, DRAM, and SDRAM, any memory device derived therefrom, as well as any signals containing or otherwise including instructions that may be stored within the memory device, as will be appreciated by one skilled in the art.

The operational memory 315 may provide temporary storage for the controller 305, that may be used during the operation of the controller 305. It will be appreciated that the operational memory 315 may instead, or in addition, be located within the controller 305. The applications memory 320 may include, for example, programming used by the controller 305 in carrying-out the functionality of the SCP 234 described herein, including an application that may be used in the blocking of a telephone call described herein. The database 330 may include information used while carrying-out the functionality of the SCP, including LATA information for various telephone subscribers within the telecommunications network 200.

Figure 4:
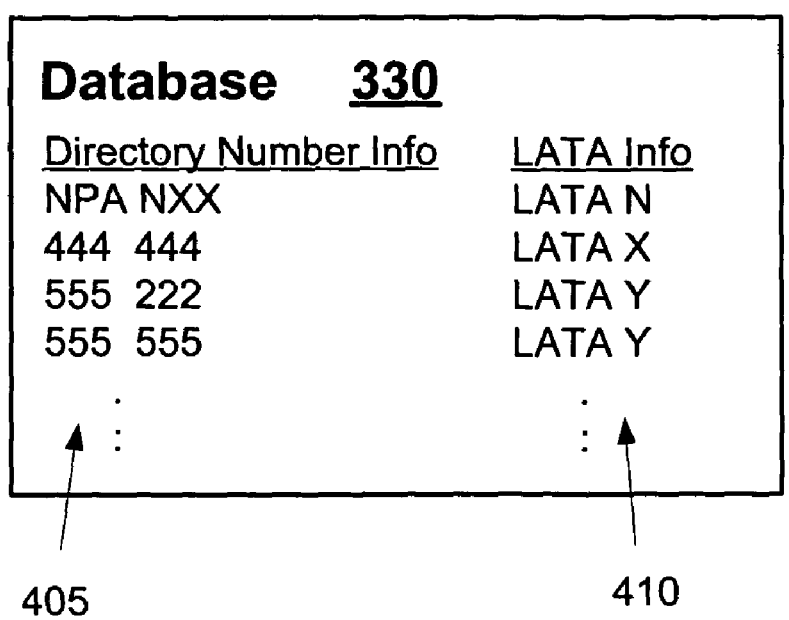
FIG. 4 is a block diagram of a database for a Service Control Point/Application Server of FIG. 3, in accordance with an embodiment of the invention.

FIG. 4 is a block diagram representation of the database 330, and specifically, a portion of the database 330 that includes LATA information, in accordance with an embodiment of the invention. As shown in FIG. 4, the database 330 includes a LATA lookup table, in the form of a Directory Number Info portion 405, and a LATA Info portion 410. The Directory Number Info portion 405 includes information regarding NPAs and NXXs for one or more telephone subscribers of the telecommunications network 200, wherein the LATA Info portion 410 includes corresponding LATA information for the NPA and NXX information of the Directory Number Info portion 405. The corresponding LATA information is typically the LATA in which the telephone subscribers with the corresponding NPA and NXX are located. For example, as shown in FIG. 4, telephone subscribers with NPA of 444 and NXX of 444 are located within the LATA X, whereas telephone subscribers having NPA of 555 and NXX of 222, or NPA of 555 and NXX of 555, are located in the LATA Y.

Returning to FIG. 2, generally, a telephone call from a calling party, such as telephone subscriber 202 having a directory number (DN) 444 444-4444, to a called party, such as telephone subscriber 238 having a DN of 555 555-5555 begins with the telephone subscriber 202 lifting the handset of his telephone and entering the DN of the party to be called. The Originating CO switch 204 then detects the intent of the telephone subscriber 202 to initiate a telephone call, determines that the telephone call to the subscriber 238 is an InterLATA telephone call, and routes the telephone call through the IXC Network 210 via the IXC carrier (i.e. long distance provider) selected by the telephone subscriber 202.

As the call is determined to be routed via the PSTN telephone network (and not a private network), the interLATA call from the telephone subscriber 202 to the telephone subscriber 238 should be routed to the LEC 230 via the FGB/FGD interLATA toll trunk communications lines 216. However, where a telephone call from the telephone subscriber 255 having a DN of 444 333-3333 is initiated to the subscriber 238, it may be determined at the Originating CO switch 204 that the subscriber 255 owns rights for utilizing the private trunk group 260, in which case, the call may be transmitted to the CLEC CO switch 222 via the private trunk group 260, and the CLEC CO switch 222 may route the telephone call to the LEC 230 via the local interconnection trunk group 240.

Where the telephone call is initiated by the telephone subscriber 250, having a DN of 555 222-2222 to the telephone subscriber 238 (and is thus an IntraLATA local or local toll telephone call), the CLEC CO switch 222 typically routes the telephone call to the LEC Tandem SSP 232 via the intraLATA trunk group 240, as will be appreciated by one skilled in the art. The telephone call is received at the LEC Tandem SSP 232, and routed to the telephone subscriber 238 via the LEC SSP 236. However, in some circumstances, for example, where the telephone call is an interLATA telephone call from the telephone subscriber 202 to the telephone subscriber 238, the telephone call may be misrouted by the LD CO switch 212 to the LEC 230 in a way that prevents the LEC from assessing proper termination charges for the telephone call. This misrouting may occur where the InterLATA call is routed from the LD CO switch 212 to the CLEC CO switch 222 via trunked communications lines 214, and further to the LEC Tandem SSP 232 via the local interconnection trunk group 240.

Figure 5:
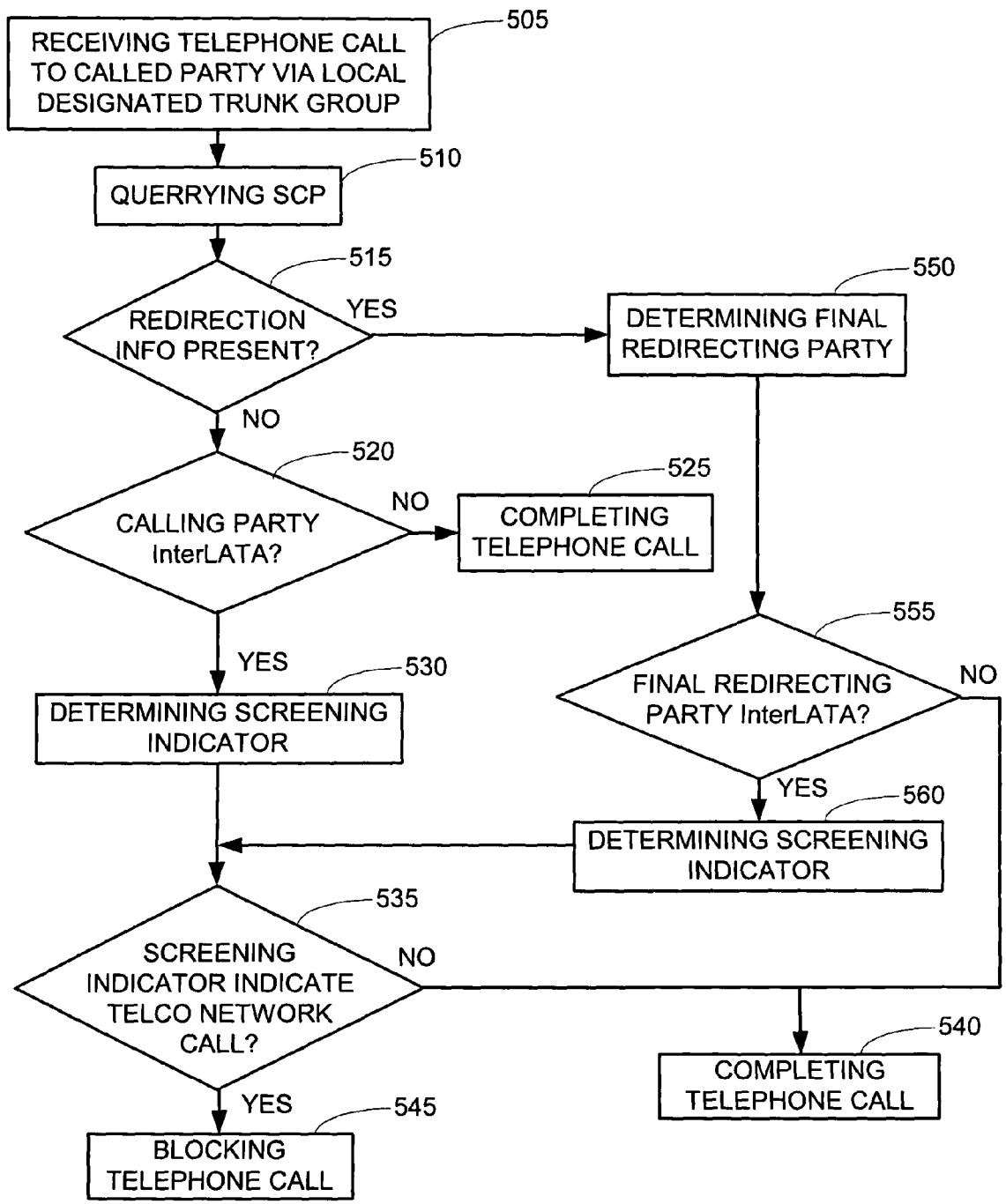
FIG. 5 is a flowchart illustrating operation of the telecommunications network of FIG. 2 in the blocking of a telephone call, in accordance with an embodiment of the invention.

FIG. 5 is a flowchart illustrating operation of the telecommunications network in the blocking of a telephone call, in accordance with an embodiment of the invention. The operation of the telecommunications network 200 described in FIG. 5 will be discussed mainly in the context where the telephone subscriber 202 (calling party) places an InterLATA telephone call to the telephone subscriber 238 (called party). The telephone call is routed via the IXC network 210 using LD CO switch 212, operated by telecommunications provider 2. The call is misrouted from the LD CO switch 212 to the LEC 230 by routing the call to the CLEC CO switch 222 via trunked communication lines 214, and to the LEC Tandem SSP 232 via the local interconnection trunk group 240, instead of a proper routing between the LD CO switch 212 and the LEC 230 via the FGB/FGD interLATA toll trunked connection lines 216.

As shown in FIG. 5, the telephone call from the telephone subscriber 202 to the telephone subscriber 238 is received 505 via the local-designated trunk group, here the local interconnection trunk group 240. The LEC Tandem SSP 232 encounters a trunk-based trigger, for example, an originating trigger such as a Shared Interoffice Trunk Trigger (SIT) or an Off-Hook Delay (OHD) trigger, that has been provisioned on the local interconnection trunk group 240, and queries 510 the SCP 234 responsive to the trigger. The querying, for example, may include the LEC Tandem SSP 232 launching a query, such as an Advanced Intelligent Network (AIN) Info_Collected query. The Info_Collected query message includes information such as the DN of a called party, the DN of the calling party, and any redirecting information for the telephone call. Such redirecting information typically results from one of the telephone subscribers, for example the telephone subscribers 202 or 238, subscribing to a telephone service that redirects telephone calls, for example, a call forwarding service. The Info_Collected query message further includes screening indicator information. One skilled in the art will realize that the screening indicator information includes a two bit screening indicator associated with the calling party DN (or any redirecting party DNs, as described below) that describes whether the call was transmitted at least in part using a private telephone network, for example, the private trunk group 260, or whether the telephone call was transmitted using only the public telephone network, for example, an IXC network 210 such as the LD CO switch 212 via trunked communication lines 214 or 216, where no private network is utilized in transmission of the telephone call. The screening indicator will be discussed in more detail below.

The SCP 234 receives the Info_Collected query from the LEC Tandem SSP 232, and using programming logic provided within the applications memory 320 of the SCP 234, determines 515 whether redirection information is present for the telephone call. This determination may be made using the Redirectiion_Information field of the Info_Collect query message, that includes a redirection indicator indicating whether the telephone call has been redirected one or more times, as will be appreciated by one skilled in the art.

Where it is determined that no redirection information is present at box 515, it is determined at box 520 whether the call from the calling party directory number is an InterLATA call with respect to the LEC Tandem SSP 232 (i.e., whether the calling party and the Tandem SSP 232 are located in the same LATA). Such a determination may be made, for example, by the SCP 234 using the LATA information from the database 330. For example, the SCP 234 may lookup the NPA and NXX of the calling party, here the telephone subscriber 202 DN (444-4444) in the database 330, and determine that the calling party is located in LATA X. The SCP 234 may then determine that the Tandem SSP 232 (the SSP used in providing telephone service to the called party, here the telephone subscriber 238) is located in the LATA Y. This may be accomplished, for example, using a point code for the LEC Tandem SSP 232 that is transmitted to the SCP 234 as part of the Info_Collected query message, and a table at the SCP (not shown) identifying the LATAs for SSPs based on point code information, as is known and appreciated by one skilled in the art.

In contrast, where the telephone call is placed instead from the telephone subscriber 250 to the telephone subscriber 238, it would be determined at the SCP 234 that the LATA for the calling party is the same as the LATA for the LEC tandem SSP 232, and thus that the calling party is not InterLATA with respect to the LEC Tandem SSP 232 at box 520.

Where it is determined that the calling party call is not InterLATA with respect to the LEC Tandem SSP 232 at box 520, the telephone call is completed as shown at box 525. This may be accomplished, for example, by the SCP 234 generating an Analyze_Route_Response message and sending the Analyze_Route_Response message to the LEC Tandem SSP 232, indicating that the call may be completed with the telephone subscriber 238, and by the LEC Tandem SSP 232 routing the telephone call through the LEC SSP 236 to the subscriber 238.

Where it is determined that the calling party call is InterLATA with respect to the LEC Tandem SSP 232 at box 520, a screening indicator value is determined as shown at box 530. As discussed above, the screening indicator is a two bit value that indicates whether the call has been transmitted at least in part using a private network, or using only the public telephone network.

Where the telephone call received at the CLEC 220 was transmitted to the CLEC 220 using a private telephone network for transmission of at least part of the call (i.e. via the Internet, or privately owned trunk groups such as the private trunk group 260), a screening indicator value of 00, 01 or 10 may have been assigned. However, where the call received at the CLEC 220 is coming from the public telephone network (i.e., the LD CO switch 212 and trunked communications lines 214) where no private network was utilized in transmission of the telephone call, a screening indicator of 11 may have been assigned, indicating that the call is a public telecommunications network provided telephone call. The screening indicator value is determined at box 530 by determining the screening indicator value associated with the Calling_Party ID parameter of the Info_Collected query message.

After determining the screening indicator value at box 530, it is determined at box 535 whether the screening indicator value indicates a public telecommunications network provided call (i.e., a telephone call was transmitted using only the public telephone network). For example, this determination may be made at the SCP 234 by determining whether the screening indicator value determined at box 530 is equal to 11. Where it is determined by the SCP 234 that the screening indicator value is not equal to a value of 11 (i.e., the screening indicator value is equal to 00, 01, or 10), the SCP determines that the screening indicator value does not indicate a public telecommunications network provided call at box 535, for example, that a private telephone network was used in the transmission of the telephone call. This may occur, for example, where a subscriber such as the subscriber 255 having rights to use the private trunk group 260 calls the subscriber 238, where the call is routed from the Originating CO switch 204 to the CLEC CO switch 222 via the private trunk group 260, and routed from the CLEC CO switch 222 to the LEC 230 via the local interconnection trunk group 240. In this case, the telephone call is allowed to complete as shown at box 540, in a similar fashion as discussed above with respect to box 525.

However, where the screening indicator value is equal to a value of 11, it is determined at box 535 that the screening indicator value does indicate a public telephone communications network provided call, for example, where a private network was not used in any part of the transmission of the telephone call. This may occur, for example, in the situation described with respect to FIG. 5, where the subscriber 202 calls the subscriber 238, and the call is routed from the Originating CO switch 204 to the LD CO switch 212, from the LD CO switch 212 to the CLEC CO switch 222, and from the CLEC CO switch 222 to the LEC 230 via the local interconnection trunk group 240. In this circumstance, the call is blocked as shown at box 545. The call may be blocked, for example, by the SCP 234 generating an AIN Send_To_Resource message and sending the Send_To_Resource message to the LEC Tandem SSP 232 in response to the Info_Collected query message. The Send_To_Resource message indicates to the LEC Tandem SSP 232 that the call is to be routed to an announcement indicating to the telephone subscriber 202 and that the call is not to be completed, and thereby causes the telephone call to be blocked. The announcement may be, for example, "I'm sorry, but your telephone call cannot be completed at this time. Please contact your long distance carrier for more information."

Returning to box 515, where it is determined that there is redirection information present for the telephone call, a final redirecting party is determined for the telephone call, as shown at box 550. The final redirecting party is determined to be the final telephone subscriber to have redirected the telephone call before the call reaches the LEC Tandem SSP 232. This may be determined, for example, by examining the Redirecting PartyID information field and/or OriginalCalled PartyID information field sent as part of the Info_Collected query message. As will be appreciated by one skilled in the art, these fields are populated depending on how many times the telephone call to the called party was redirected (i.e., forwarded) before the telephone call is received at the LEC Tandem SSP 232. Where the call to the called party was redirected only one time, the DN of the redirecting party will be placed in an OriginalCalled PartyID digits field of the Info_Collected query message, and no information will be present in the Redirecting PartyID digits field of the Info_Collected query message to the SCP 234. In this case, the final redirecting party will be determined to be the telephone subscriber having a DN shown by the OriginalCalled PartyID digits of the Info_Collected query message. However, where the telephone call to the called party was redirected more than one time, the DN of the original party to redirect the call will be placed in an OriginalCalled PartyID digits field of the Info_Collected query message, and the DN of the final party to redirect the call to the called party will be placed in the Redirecting PartyID digits field of the Info_Collected query message. In this case, the final redirecting party will be determined as the telephone subscriber having a DN shown by the Redirecting PartyID digits of the Info_Collected query message.

After determining the final redirecting party at box 550, it is determined at box 555 whether the final redirecting party DN is interLATA with respect to the LEC Tandem SSP 232. This may be accomplished using the database 330 in a similar fashion as discussed with respect to box 520, where the SCP 234 looks up the NPA NXX of the final redirecting party in the database 330, and determines the LATA of the LEC Tandem SSP 232, to determine the respective LATAs for the final redirecting party and the LEC Tandem SSP 232. Where the LATAs are the same, the final redirecting party is determined not to be InterLATA at box 555. However, where the LATAs are different, the final redirecting party is determined to be InterLATA with respect to the LEC Tandem SSP 232 at box 555.

Where it is determined at box 555 that the final redirecting party is not interLATA with respect to the LEC Tandem SSP 232, the telephone call is completed as shown at box 540, as described above. However, where it is determined at box 555 that the final redirection party is interLATA with respect to the LEC Tandem SSP 232, a screening indicator is determined as shown at box 560. The determination of the screening indicator value differs from that described above, as redirection information is present for the telephone call. The determination of the screening indicator value at box 560 depends on how many times the telephone call has been redirected. For example, the SCP 234 determines whether there is any information (i.e., a DN) present in the Redirection_party ID of the info_collected query message. Where there is information present, the screening indicator value associated with the Redirecting_party ID parameter of the Info_Collected query message is determined by the SCP as the value of the screening indicator at box 560. Where no information is present in the Redirecting_party ID field, the SCP 234 determines the screening indicator value associated with the Original_called_party ID parameter of the Info_collected query message as the screening indicator value at box 560. After determining the screening indicator value at box 560, flow continues to box 535, where it is determined whether the screening indicator indicates that the call is a public telecommunications network provided call, as discussed above.

Although the system and method of blocking a telephone call has been discussed above as being carried out in the context of the telecommunications network 200 of FIG. 2, it will be appreciated by one skilled in the art that other configurations of telecommunications networks may be utilized to carry out the functionality described herein. Further, while the application logic used in determining whether to block a telephone call has been described as being implemented within the SCP 234, it will be appreciated by one skilled in the art that such application logic may be provided at other locations of (i.e., other devices within) the telecommunications network, while still achieving the advantages discussed herein. For example, any SSP within the telephone system may include such application logic used in determining whether to block a telephone call, for example, the LEC Tandem SSP 232 or the LEC SSP 236. In this case, the SSP is provided LATA information (i.e., either resident on the SSP or at an accessible external location) for use in the determination of whether the telephone call is to be blocked.

Although the SCP 234 is shown to be coupled to the LEC Tandem SSP 232 of FIG. 2, it will be appreciated that other configurations are possible. For example, the SCP 234 may instead be coupled with the LEC SSP 236, where the queries launched to the SCP 234 may be launched by the LEC SSP 236 rather than the LEC Tandem SSP 232. Further, the LEC Tandem SSP 232 need not be provided, in which case the LEC SSP 236 is connected with the local Interconnection trunk group 240 and the InterLATA interconnection trunk group 216. Similarly, the LEC SSP 236 need not be provided, in which case the LEC Tandem SSP 232 may be coupled directly with, and provide telephone service for, the telephone subscriber 238.

Thus, a system and method have been described for blocking a telephone call received at a local-designated trunk group of an SSP, including determining if the calling party is interLATA with respect to the SSP of a LEC serving the called party. Where the calling party is InterLATA, a screening indicator value may be determined, and the telephone call may be blocked where the screening indicator value indicates that the telephone call is public telecommunications network provided. By blocking such InterLATA calls received via local-designated trunk groups, a service provider operating the LEC SSP serving the called party doesn't consume telephone network resources to complete such a telephone call, as completion of the interLATA call via the local designated trunk group may result in failure of the service provider to assess appropriate termination fees for the telephone call.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of blocking a telephone call from a calling party to a called party, comprising:
   receiving a telephone call from the calling party at a local-designated trunk group of a service switching point (SSP) serving the called party;
   determining, based on redirection information contained in a redirection field of an Info_Collected query message associated with the telephone call sent to the service control point, if the Local and Access Transport Area (LATA) of the calling party is interLATA with respect to the SSP, wherein the SSP is within an SSP LATA; and
   when the calling party is interLATA with respect to the SSP, determining a screening indicator value, wherein the screening indicator value comprises a value of a field, other than the redirection field, in the Info_Collect query message, wherein the screening indicator value indicates whether the telephone call has been transmitted at least in part using a private network, and blocking the telephone call when the screening indicator value indicates that the telephone call has been transmitted at least in part using a private network.

2. The method of claim 1, further comprising allowing the telephone call to proceed when the screening indicator value indicates that the telephone call has been transmitted entirely using a public network.

3. The method of claim 1, wherein the determining whether the calling party is interLATA with respect to the SSP includes:

determining a final redirecting party that redirected the telephone call to the called party;
determining a final redirecting party directory number;
determining a final redirecting party LATA responsive to the final redirecting party directory number; and
comparing the SSP LATA with the final redirecting party LATA.

4. The method of claim 3, wherein the determining the final redirecting party LATA includes looking up the final redirecting party directory number in a database of a service control point.

5. The method of claim 3, wherein the redirection information includes information present in at least one of an OriginalCalledPartyID field and a RedirectingPartyID field of the Info_Collected query message, and wherein the determining the final redirecting party directory number includes:

determining the final redirecting party directory number as the OriginalCalledPartyID of the Info_Collected query message when the telephone call was redirected one time; and
determining the final redirecting party directory number as the RedirectingPartyID of the Info_Collected query message when the telephone call was redirected more than one time.

6. The method of claim 1, wherein the determining whether the calling party is interLATA with respect to the SSP is determined responsive to a trunk-associated trigger encountered on the local-designated trunk group during processing of the telephone call.

7. The method of claim 6, wherein the trunk-associated trigger is an originating trigger.

8. The method of claim 7, wherein the originating trigger is one of a Shared Interoffice Trunk Trigger and an Off-Hook Delay trigger.

9. The method of claim 1, wherein the local-designated trunk group is a local incoming interconnection trunk group.

10. The method of claim 1, wherein the screening indicator value is indicative of whether a termination fee for the telephone call is applicable.

11. The method of claim 1, wherein the blocking the telephone call includes blocking the telephone call when the screening indicator value is equal to a value of binary 11.

12. A telecommunications network for blocking a telephone call from a calling party to a called party, the telephone call having corresponding voice and control information wherein the control information includes screening indicator information, the calling party associated with a calling party directory number, comprising:

a local-designated trunk group over which the telephone call from the calling party is received;
a service switching point (SSP) coupled with the local-designated trunk group, the SSP receiving the telephone call, generating a query message including the calling party directory number, and sending the query message to a service control point; and
the service control point (SCP) coupled with the SSP, the SCP receiving the query message, and determining, based on redirection information contained in a redirection field of an Info_Collected query message associated with the telephone call sent to the service control point, when the calling party is inter Local Access and Transport Area (interLATA) with respect to the SSP, and when the calling party is interLATA, the SCP determining a screening indicator value, wherein the screening indicator value comprises a value of a field, other than the redirection field, in the Info_Collect query message, wherein the screening indicator value indicates whether the telephone call has been transmitted at least in part using a private network, and
generating a response message to the SSP to block the telephone call received via the local-designated trunk group when the screening indicator value indicates that the telephone call has been transmitted at least in part using a private network.

13. The telecommunications network of claim 12, including the SCP generating a response message to the SSP to allow the telephone call to proceed when the screening indicator value indicates that the telephone call has been transmitted entirely using a public network.

14. The telecommunications network of claim 12, wherein the SSP is determined to have an SSP LATA, and further comprising a LATA database at the SCP listing directory number information and corresponding LATA information for a plurality of telephone subscribers, and
the SCP determining whether the calling party is interLATA with respect to the SSP includes the SCP
determining a directory number of a final redirecting party that redirected the telephone call to the called party,
searching the LATA database for directory number information of the final redirecting party to determine a final redirecting party LATA, and
comparing the final redirecting party LATA with the SSP LATA.

15. The telecommunications network of claim 14, and the SCP determining the final redirecting party directory number includes the SCP determining the final redirecting party directory number as an OriginalCalledPartyID of the redirection field of the Info_Collected query message when the telephone call was redirected one time, and
determining the final redirecting party directory number as a Redirecting PartyID of the redirection field of the Info_Collected query message when the telephone call was redirected more than one time.

16. The telecommunications network of claim 15, wherein the SCP determining the screening indicator value includes the SCP:

determining the screening indicator value associated with the OriginalCalledPartyID parameter of the Info_Collected query message when the telephone call was redirected one time; and
determining the screening indicator value associated with the Redirecting PartyID parameter of the Info_Collected query message when the telephone call was redirected more than one time.

17. The telecommunications network of claim 12, wherein the SSP generating and sending the query message is accomplished responsive to a trunk-associated trigger on the local-designated trunk group encountered at the SSP during processing of the telephone call.

18. The telecommunications network of claim 17, wherein the trunk-associated trigger is an originating trigger.

19. The telecommunications network of claim 18, wherein the originating trigger is one of a Shared Interoffice Trunk Trigger and an Off-Hook Delay trigger.

20. The telecommunications network of claim 12, wherein the local-designated trunk group is a local incoming interconnection trunk group.

21. The telecommunications network of claim 12, wherein the screening indicator value indicates whether a termination fee for the telephone call is applicable.

22. The telecommunications network of claim 12, wherein the generating a response message to the SSP to block the telephone call includes generating a response message to the SSP to block the telephone call received via the local-designated trunk group when the screening indicator value is equal to binary 11.

23. A service control point used in the blocking of a telephone call, the telephone call being transmitted from a calling party to the called party over a local-designated trunk group associated with the called party, comprising:
   a controller for controlling operation of the service control point; and
   a memory device coupled with the controller and including directory number information and corresponding Local Access and Transport Area (LATA) information for a plurality of telephone subscribers;
   wherein the controller controlling operation of the service control point includes the controller
      determining, based on redirection information contained in a redirection field of an Info_Collected query message associated with the telephone call sent to the service control point, if the calling party is interLATA with respect to a service switching point coupled to the local-designated trunk group, using information from the query message and the memory device,
      wherein if it is determined that the calling party is interLATA, the controller determining a screening indicator value, wherein the screening indicator value comprises a value of a field, other than the redirection field, in the Info_Collect query message, wherein the screening indicator value indicates whether the telephone call has been transmitted at least in part using a private network, and generating a response message used in the blocking of the telephone call received over the local-designated trunk group when the screening indicator value indicates that the telephone call has been transmitted at least in part using a private network.

24. A non-transitory computer readable memory media for use in a telecommunications network device, the memory media comprising instructions executable to:
   detect a telephone call from a calling party to a called party at a local-designated trunk group coupled to a service switching point (SSP) servicing the called party;
   determine, based on redirection information contained in a redirection field of an Info_Collected query message associated with the telephone call sent to the service control point, when the calling party is inter Local Access and Transport Area (interLATA) with respect to the SSP; and
   determine, based on a screening indicator value when the calling party is intreLATA with respect to the SSP, wherein the screening indicator value comprises a value of a field, other than the redirection field, in the Info_Collected query message, wherein the screening indicator value indicates whether the telephone call has been transmitted at least in part using a private network, and for generating a response message to block the telephone call received over the local-designated trunk group when the screening indicator value indicates that the telephone call has been transmitted at least in part using a private network.

25. The memory media of claim 24, wherein the telecommunications network device is a service control point, and wherein the screening indicator value indicates whether a termination fee for the telephone call is applicable.

26. A non-transitory computer readable memory media for use in a telecommunications network device, the memory media comprising instructions executable to:
   receive an indication of a telephone call from a calling party to a called party at a local-designated trunk group coupled to a service switching point (SSP) servicing the called party;
   determine, based on redirection information associated with the telephone call contained in a redirection field of an Info_Collected query message sent to the service control point, when the calling party is inter Local Access and Transport Area (interLATA) with respect to the SSP; and
   determine, based on a screening indicator value, wherein the screening indicator value comprises a value of a field, other than the redirection field, in the Info_Collect query message, wherein the screening indicator value indicated whether the telephone call has been transmitted at least in part using a private network, when the calling party is interLATA with respect to the SSP, and for generating a response message to block the telephone call received over the local-designated trunk group when the screening indicator value indicates that the telephone call is interLATA with respect to the SSP been transmitted at least in part using a private network.

27. The memory media of claim 26, wherein the telecommunications network device is a service control point, and wherein the screening indicator value indicates whether a termination fee for the telephone call is applicable.

* * * * *